Patented May 24, 1938

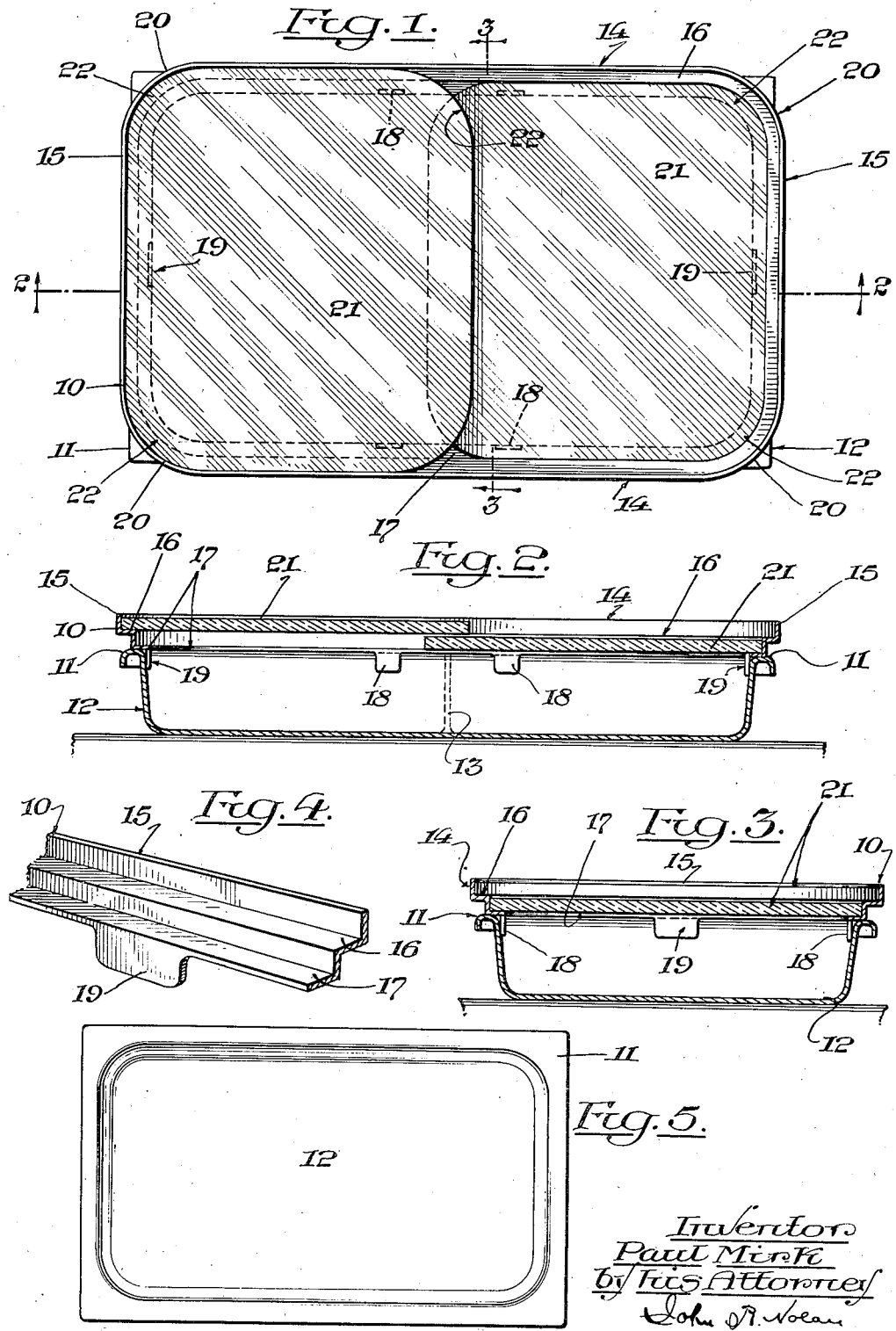

2,118,099

UNITED STATES PATENT OFFICE 2,118,099

SANITARY COVER FOR FOOD PANS

Paul Mirk, New York, N. Y.

Application July 17, 1937, Serial No. 154,151

2 Claims. (Cl. 65—16)

This invention relates to a cover for food pans, such, for example, as the pans from which comestibles are dispensed in cafeterias, delicatessen stores, and the like.

The object of the invention is to provide a sanitary cover of simple and inexpensive construction which can be readily applied to or removed from a standard food pan, which device when in service enables either end of the pan to be readily opened or closed with facility and dispatch, or the pan to be entirely closed and hermetically sealed, as desired. Not only is the cover readily removable and replaceable in its entirety, but its elements can be readily separated for cleaning purposes and can be as readily assembled.

A preferred form of embodiment of my invention will be hereinafter described and the scope of the invention expressed in the appended claims.

In the drawing—

Figure 1 is a plan of my improved cover as applied to a food pan.

Fig. 2 is a longitudinal vertical section of the cover and pan, as on the line 2—2 of Fig. 1.

Fig. 3 is a transverse vertical section, as on the line 3—3 of Fig. 1.

Fig. 4 is a sectional detail of one end of the frame structure.

Fig. 5 is a plan of an ordinary food pan.

The pan cover illustrated comprises an open rectangular frame, 10, adapted to be removably supported upon and throughout the flange or rim, 11, of an elongated rectangular food pan, 12, of usual construction, which pan in some cases is formed with a transverse central partition, as indicated by the dotted lines 13 in Fig. 2, in order to divide the interior of the pan into compartments for the separate reception of different articles of food. The frame 10 is an integral structure whereof the sides 14 and ends 15 are of step formation in cross-section to present upper and lower parallel ledges, 16 and 17, throughout the interior surface of the frame, which sides and ends are provided with depending lugs, 18 and 19, respectively, adapted and arranged to abut the adjacent inner walls of the pan when the frame is supported by the latter. In the present instance each end of the frame 10 has a centrally disposed lug 19, and each side has two lugs 18 spaced from the central portion of the side, which latter lugs are thus located in order to escape the partition (13) of a two compartment pan. The corners of the frame 10 are rounded, as at 20, thus enabling the efficient application of the frame to pans having either curved or angular corners.

Slidably seated upon the respective ledges 16 and 17 of the frame are two panels 21, of glass or other transparent material, the dimensions of which panels are such that they can be independently moved in superimposed relation from end to end of the frame 10 in a manner to open one and close the other end portion of the pan in alternation or to close the pan entirely, as occasion may require. The panels are of substantial weight in order that they shall rest in close sliding contact with their respective ledges 16 and 17, and the corners of each panel are rounded, as at 22, correspondingly with the corners of the frame in order to insure efficient contact of the panel with the opposing end and corners of the frame when the panel is slid to either end of the pan.

From the foregoing it will be seen that a cheap and efficient cover construction for food pans is provided which well fulfills the object of my invention.

I claim—

1. A cover for food pans of the character described, embodying an integral open rectangular frame adapted to be removably supported upon and throughout the upper edge of a pan, and transparent panels removably seated upon the frame and independently slidable longitudinally thereof, the sides and ends of said frame being of step formation in cross-section to present upper and lower parallel ledges throughout the inner surface of the frame and having also depending portions adapted to abut the adjacent walls of the pan, and said panels being seated in superimposed relation on the respective ledges so as to be independently slidable from end to end of the frame in a manner to open one and close the other end portion of the pan in alternation or to close the pan entirely.

2. A cover for food pans of the character described, embodying an integral open rectangular frame having rounded corners and adapted to be removably supported upon and throughout the upper edge of a pan, and panels removably seated upon the frame and independently slidable longitudinally thereof, the sides and ends of said frame being of step formation in cross-section to present upper and lower parallel ledges throughout the inner surface of the frame and having also spaced depending lugs adapted to abut the adjacent walls of the pan, and said panels having rounded corners corresponding with the corners of the frame and being seated in superimposed relation on the respective ledges so as to be independently slidable from end to end of the frame in a manner to open one and close the other end portion of the pan in alternation or to close the pan entirely.

PAUL MIRK.